US010862807B2

(12) United States Patent
Vytla et al.

(10) Patent No.: US 10,862,807 B2
(45) Date of Patent: Dec. 8, 2020

(54) PACKET TELEMETRY DATA VIA FIRST HOP NODE CONFIGURATION

(71) Applicant: Cisco Technology, Inc., San Jose, CA (US)

(72) Inventors: Mouli Vytla, San Jose, CA (US); Souvik Ghosh, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 70 days.

(21) Appl. No.: 16/136,007

(22) Filed: Sep. 19, 2018

(65) Prior Publication Data

US 2020/0092211 A1    Mar. 19, 2020

(51) Int. Cl.
*H04L 12/813* (2013.01)
*H04L 12/741* (2013.01)
*H04L 12/935* (2013.01)
*H04L 12/851* (2013.01)
*H04L 12/823* (2013.01)

(52) U.S. Cl.
CPC .......... *H04L 47/20* (2013.01); *H04L 45/745* (2013.01); *H04L 47/2483* (2013.01); *H04L 47/32* (2013.01); *H04L 49/3009* (2013.01)

(58) Field of Classification Search
CPC .... H04L 47/20; H04L 45/745; H04L 47/2483
See application file for complete search history.

(56) References Cited

U.S. PATENT DOCUMENTS

| | | | |
|---|---|---|---|
| 7,472,200 B1* | 12/2008 | Taylor | H04L 45/00 709/227 |
| 7,525,921 B1* | 4/2009 | Yi Dar Lo | H04L 45/02 370/241 |
| 7,706,296 B2* | 4/2010 | Talpade | H04L 41/142 370/232 |
| 8,605,588 B2* | 12/2013 | Sankaran | H04L 43/0829 370/235 |
| 8,937,950 B2* | 1/2015 | Dunbar | H04L 29/12028 370/392 |
| 9,942,152 B2* | 4/2018 | Jalan | H04L 47/125 |
| 9,985,857 B2* | 5/2018 | Balasubramanian | H04L 67/2804 |
| 10,200,212 B2* | 2/2019 | Song | H04L 12/4662 |

(Continued)

FOREIGN PATENT DOCUMENTS

CN    104702468 A  *  6/2015
KR    101866377 B1     6/2018

OTHER PUBLICATIONS

Tal Mizrahi, "Network Telemetry Solutions for Data Center and Enterprises Networks," Mar. 2018.

(Continued)

*Primary Examiner* — Parth Patel
(74) *Attorney, Agent, or Firm* — Patterson + Sheridan, LLP

(57) ABSTRACT

Techniques for monitoring packet telemetry are provided. A policy is received at a first node from a controller, where the policy includes an indication of a first flow. A first packet belonging to the first flow is received at the first node. A second node in a network path for the first packet is determined. A first header is added to the first packet based on the policy, wherein the first header includes an indication of the controller. The first packet is transmitted to the second node. Finally, telemetry data associated with the first node is transmitted to the controller based on the policy.

18 Claims, 8 Drawing Sheets

(56) References Cited

U.S. PATENT DOCUMENTS

| | | | |
|---|---|---|---|
| 10,218,414 B2* | 2/2019 | Bi | H04L 41/0826 |
| 10,356,037 B2* | 7/2019 | Devarajan | H04L 12/6418 |
| 10,491,511 B1* | 11/2019 | Gopalarathnam | H04L 45/74 |
| 2002/0062394 A1* | 5/2002 | Bunn | H03M 7/30 |
| | | | 709/246 |
| 2004/0205210 A1* | 10/2004 | Hamano | H04L 63/1458 |
| | | | 709/230 |
| 2004/0208153 A1* | 10/2004 | Mizell | H04L 45/306 |
| | | | 370/338 |
| 2014/0192645 A1* | 7/2014 | Zhang | H04L 47/12 |
| | | | 370/235 |
| 2015/0117220 A1* | 4/2015 | Turanyi | H04L 47/32 |
| | | | 370/236 |
| 2015/0223105 A1* | 8/2015 | Leblanc | H04W 28/0242 |
| | | | 370/230.1 |
| 2015/0263889 A1* | 9/2015 | Newton | H04L 47/10 |
| | | | 370/254 |
| 2015/0326442 A1* | 11/2015 | Li | H04B 5/0056 |
| | | | 709/223 |
| 2015/0365281 A1* | 12/2015 | Marino | G06Q 30/04 |
| | | | 709/223 |
| 2016/0073220 A1* | 3/2016 | Wang | H04W 4/80 |
| | | | 455/41.2 |
| 2016/0099853 A1* | 4/2016 | Nedeltchev | H04L 43/0852 |
| | | | 370/253 |
| 2017/0041157 A1* | 2/2017 | Zheng | H04L 12/18 |
| 2017/0064583 A1* | 3/2017 | Roy | H04W 36/0005 |
| 2017/0126527 A1* | 5/2017 | Ouedraogo | H04L 43/0864 |
| 2017/0317952 A1* | 11/2017 | Sillankorva | H04L 25/05 |
| 2018/0123927 A1* | 5/2018 | Chang | H04L 69/22 |
| 2018/0241700 A1* | 8/2018 | Sazawa | H04L 49/9057 |
| 2018/0287820 A1* | 10/2018 | Mayer-Wolf | H04L 49/3009 |
| 2018/0322437 A1* | 11/2018 | Mcclory | G06F 9/5027 |
| 2019/0044812 A1* | 2/2019 | Loftus | H04L 47/762 |
| 2019/0297529 A1* | 9/2019 | Hampel | H04W 28/06 |

OTHER PUBLICATIONS

Zhu et al., "Packet-Level Telemetry in Large Datacenter Networks," SIGCOMM '15, Aug. 17-21, 2015.

In-situ OAM raw data export with IPFIX [Accessed Online Sep. 17, 2018] https://datatracker.ietf.org/doc/draft-spiegel-ippm-ioam-rawexport/?include_text=1.

* cited by examiner

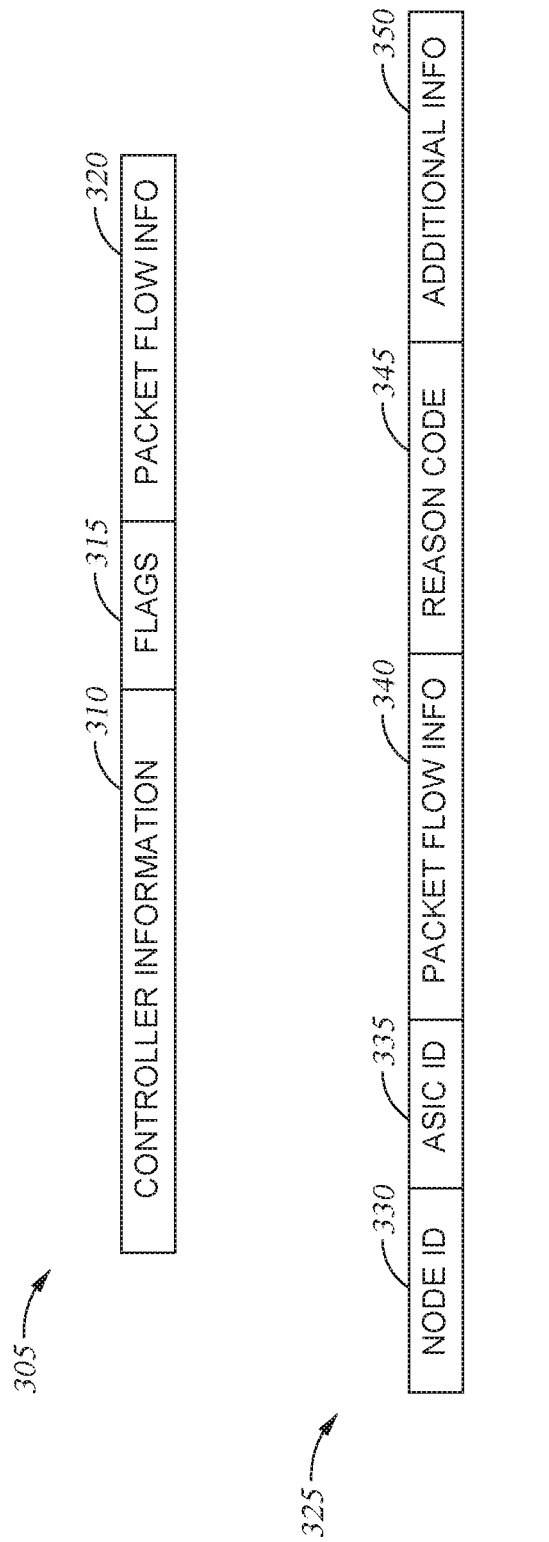

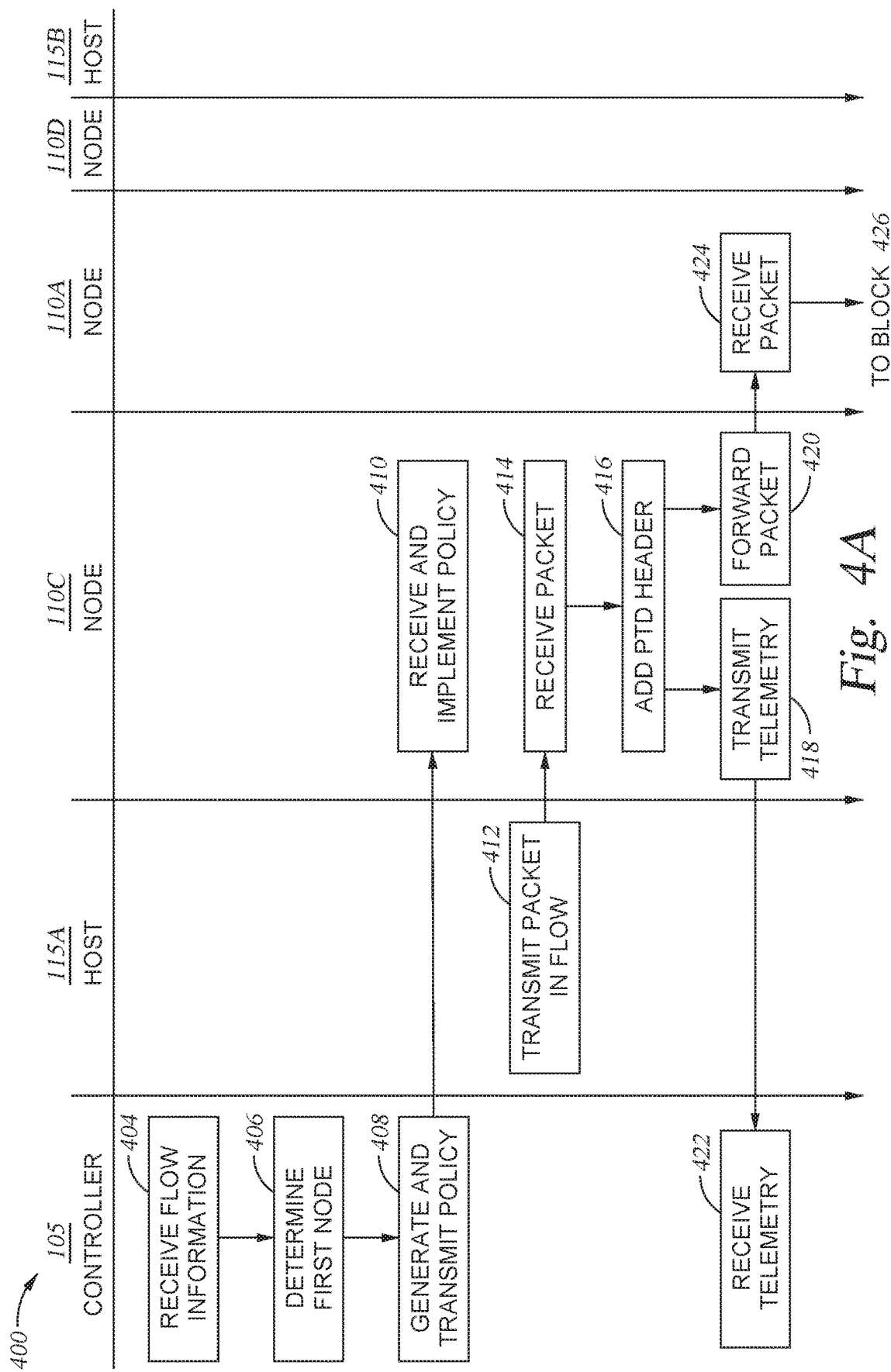

PACKET TELEMETRY DATA VIA FIRST HOP NODE CONFIGURATION

TECHNICAL FIELD

Embodiments presented in this disclosure generally relate to packet telemetry. More specifically, embodiments disclosed herein relate to use of policies to track telemetry of packets in a network.

BACKGROUND

Detecting packet drops in network flows, as well as isolating the node where the drop occurred, is a challenge for network operators. Identifying problematic nodes becomes increasingly more challenging as the scale of the network topology increases. Further, packet drops due to inaccurate programming are particularly hard to identify, as the control plane can be working perfectly, yet packets continue to be dropped even when redundant paths or nodes are available. Existing solutions to track packet telemetry are insufficient for many implementations. For example, existing telemetry solutions require configuration of every node in the path, random sampling of packets, excessive data to be carried in packet headers, and the like. Further, existing solutions do not provide sufficient detail with respect to the root cause of the drop.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 3 illustrates a packet telemetry data header and a packet telemetry data frame, according to one embodiment disclosed herein.

FIGS. 4A and 4B illustrate a workflow for monitoring packet telemetry, according to one embodiment disclosed herein.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
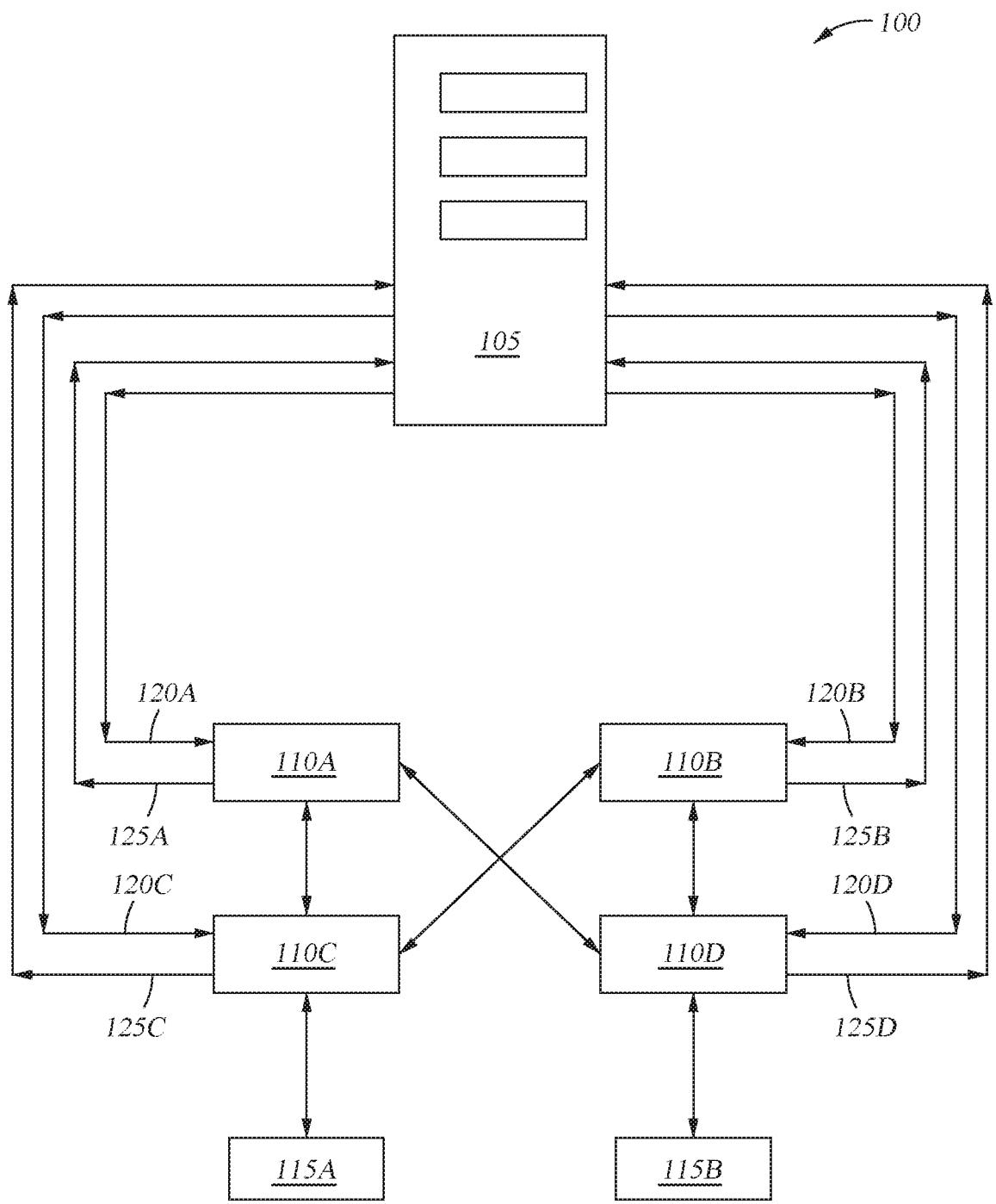
FIG. 1 illustrates a system configured to provide packet telemetry data, according to one embodiment disclosed herein.

According to one embodiment presented in this disclosure, a method is provided. The method includes receiving a policy at a first node from a controller, wherein the policy includes an indication of a first flow. The method further comprises receiving, at the first node, a first packet belonging to the first flow, and determining a second node in a network path for the first packet. Additionally, the method includes adding a first header to the first packet based on the policy, wherein the first header includes an indication of the controller, and transmitting the first packet to the second node. Finally, the method includes transmitting telemetry data associated with the first node to the controller based on the policy.

According to a second embodiment presented in this disclosure, a computer product is provided. The computer product includes logic encoded in a non-transitory medium, the logic executable by operation of one or more computer processors to perform an operation. The operation includes receiving a policy at a first node from a controller, wherein the policy includes an indication of a first flow. The operation further comprises receiving, at the first node, a first packet belonging to the first flow, and determining a second node in a network path for the first packet. Additionally, the operation includes adding a first header to the first packet based on the policy, wherein the first header includes an indication of the controller, and transmitting the first packet to the second node. Finally, the operation includes transmitting telemetry data associated with the first node to the controller based on the policy.

According to a third embodiment presented in this disclosure, a device is provided. The device includes logic encoded in a non-transitory medium, the logic executable by operation of one or more computer processors to perform an operation. The operation includes receiving a policy at a first node from a controller, wherein the policy includes an indication of a first flow. The operation further comprises receiving, at the first node, a first packet belonging to the first flow, and determining a second node in a network path for the first packet. Additionally, the operation includes adding a first header to the first packet based on the policy, wherein the first header includes an indication of the controller, and transmitting the first packet to the second node. Finally, the operation includes transmitting telemetry data associated with the first node to the controller based on the policy.

Example Embodiments

Detailed network telemetry is useful for network operators and administrators, but can be difficult to obtain in modern network topologies. For example, one existing solution requires that each node in the network be manually configured with a filter to sample packets. This is a tedious and time-consuming process, and is prone to error. Further, one existing solution involves random sampling of the packets passing through a node, which does not enable granular tracking of individual flows or packets. Additionally, some existing solutions utilize in-band telemetry, where each node along the packet's path appends telemetry to the packet itself (e.g., to a header). However, the length of these headers can quickly exceed maximum sizes, and the telemetry is only retrieved when the packet reaches the last node. Thus, telemetry cannot be gathered for packets that are dropped at some intermediate node. Further, existing solutions provide generic data such as queue occupancy, but do not provide sufficient detail with respect to the reason a packet was dropped.

Embodiments of the present disclosure provide techniques for targeted telemetry tracking of individual flows, and require configuration of only the first node in the network path. In an embodiment disclosed herein, out-of-band telemetry data is sent to a centralized device from each node in the packet path. In one embodiment, a controller identifies a flow of interest. In some embodiments, the flow can be specified by user(s) and/or administrator(s). In other embodiments, the flow can be identified automatically (e.g., by determining that a threshold percentage of the packets belonging to the flow are being dropped). In an embodiment, the controller identifies a network node which is expected to be the first node the flow passes through in the topology (referred to herein as a first hop node, or FHN), based on the flow information and the known network topology.

In embodiments, the controller generates and transmits a policy to the FHN indicating the flow to be monitored. In some embodiments, the policy also includes an indication as to the data to be gathered and/or events to be monitored. In some embodiments, the policy further indicates where the telemetry data should be transmitted. In embodiments, the collected may be the controller, or some other centralized device. In an embodiment, the FHN implements the policy (such as by configuring one or more filters). When a packet from the identified flow is received by the FHN, the node inserts a packet telemetry data (PTD) header. In one embodiment, the PTD header includes an indication as to the controller or other centralized collector to which telemetry should be sent. In some embodiments, the PTD header also includes an indication as to what event(s) or data should be monitored. The packet is then forwarded to the next hop node (NHN). In embodiments, each node along the network path analyzes the PTD header, collects the relevant information, and transmits the telemetry out-of-band to the identified collector. Further, in an embodiment, when the packet reaches the last hop node (LHN) before reaching the destination workload/host, the PTD header is stripped from the packet.

Thus, embodiments of the present disclosure enable granular tracking of specific identified flows, rather than blanket collection of data or randomized sampling. Additionally, embodiments of the present disclosure enable the collection of packet telemetry data without requiring each node to append data to the packet header which reduces overhead and latency, and prevents the possibility that the data will overflow the header. Further, embodiments disclosed herein enable the monitoring of packet telemetry without requiring configuration of any nodes beyond the FHN, which allows the telemetry to be gathered quickly and with minimal modification of the network nodes. Further, embodiments disclosed herein enable more in-depth telemetry regarding the actual cause of the packet drop, as discussed in more detail below. This allows operators and administrators to more quickly implement a solution to the problem.

FIG. 1 illustrates a system 100 configured to provide packet telemetry data, according to one embodiment disclosed herein. In the illustrated embodiment, a Controller 105 controls a set of Network Nodes 110A-D. In the illustrated embodiment, the Network Nodes 110A-D are arranged in a leaf-spine topology, with Nodes 110C and 110D acting as leaves, and Nodes 110A and 1108 acting as spines. Further, as illustrated, each leaf Node 110C and 110D is connected to both spine Nodes 110A and 1106. Additionally, in the illustrated embodiment, a Host 115A is connected to the Node 110C, and a Host 1156 is connected to the Node 110D. Although two leaves and two spines, connecting two workloads (or Hosts 115), are illustrated, in embodiments, any number of network nodes and/or hosts can be present. Further, although the illustrated embodiment is a leaf-spine topology, embodiments of the present disclosure can utilize any network topology.

In the illustrated embodiment, as illustrated by arrows 120A, 120B, 120C, and 120D, the Controller 105 can push control data to each Node 110A, 1106, 110C, and 110D, respectively. In one embodiment, this control data includes policies that define how the respective Node 110 should operate with respect to routing, forwarding, switching, security policies, and the like. In one embodiment, the Controller 105 can push a PTD policy to a particular Node 110 which instructs the Node 110 to insert a PTD header to any packets belonging to the identified flow. Further, in an embodiment, when a Node 110 receives a packet having a PTD header, the Node 110 collects the specified telemetry data and transmits it to the identified Controller 105, as illustrated by the arrows 125A, 125B, 125C, and 125D. The Node 110 also transmits the packet to the next node in the network path.

For example, suppose an administrator requests tracking of a specified flow from Host 115A to Host 115B. In an embodiment, the Controller 105 determines that the Node 110C is the expected FHN, based on the network topology (e.g., because the Host 115A is connected to the Node 110C). In the illustrated embodiment, therefore, the Controller 105 pushes a PTD policy to the Node 110C, as illustrated by the arrow 120C. The Node 110C then implements the PTD policy (such as via one or more filters). In an embodiment, when a packet belonging to the flow is received, the Node 110C inserts a PTD header specifying the information to be collected, as well as an indication as to the Controller 105. The Node 110C then identifies the next node, which is either Node 110A or 1106, and transmits the packet to the next node. In some embodiments, the Node 110C selects between Node 110A and Node 1106 based on a variety of factors, including load balancing, security, congestion, and the like.

Further, in the illustrated embodiment, the Node 110C collects the telemetry specified by the policy and transmits a PTD frame to the Controller 105, as depicted by arrow 125C. Upon receipt of the packet, the Node 110A or 110B determines that it has a PTD header, and analyzes the PTD header to determine the data that is to be collected, as well as the Controller 105 to which the telemetry should be sent. The Node 110A or 110B further routes the packet to the next Node 110D. Additionally, the Node 110A or 110B transmits the collected telemetry to the Controller 105 via a PTD frame, as illustrated by arrow 125A. Notably, the Node 110A or 110B has not received any policy, configuration, or instruction from the Controller 105 regarding the particular flow or packet. Instead, the presence of the PTD header indicates that telemetry should be collected, and the contents of the PTD header provide detail about the type of telemetry and the responsible Controller 105. Further, the Node 110A does not modify the PTD header (such as by appending telemetry), and transmits the packet unchanged to the Node 110D.

In the illustrated embodiment, upon receiving the packet, the Node 110D similarly collects the identified telemetry and transmits it to the Controller 105, as illustrated by arrow 125D. Further, in one embodiment, the Node 110D determines that it is the LHN for the packet (e.g., that the next node is the Host 115B itself). Based on this determination, the Node 110D strips the PTD header from the packet, and forwards the de-encapsulated packet to the Host 115B. In this way, embodiments of the present disclosure enable telemetry to be gathered and transmitted to the Controller 105 by each Node 110, without requiring configuration of each Node 110 and without requiring the telemetry be transmitted in-band with the packet.

In embodiments disclosed herein, each Node 110 and Host 115 may comprise one or more physical devices, one or more virtual nodes, or a combination of physical and virtual nodes. Similarly, in an embodiment, the Controller 105 may be a physical device, a virtual controller, or a combination of physical and virtual. In one embodiment, each Host 115 includes one or more workloads, virtual machines, logical partitions, servers, applications, or other entities that receive and transmit data packets to other workload(s), other device(s), and/or user(s). Further, in some embodiments, if two or more potential FHN are identified, the Controller 105 can push the policy to multiple nodes. For example, if it is equally likely that two nodes are the FHN, the Controller 105 can push the policy to each of these nodes. In some embodiments, the Controller 105 determines how likely each node is to be the FHN, and pushes the policy to nodes with a confidence exceeding a threshold. For example, if it is possible, but very unlikely, that one node will be the FHN, the Controller 105 may refrain from pushing the policy to the unlikely (but possible) FHN.

Figure 2:
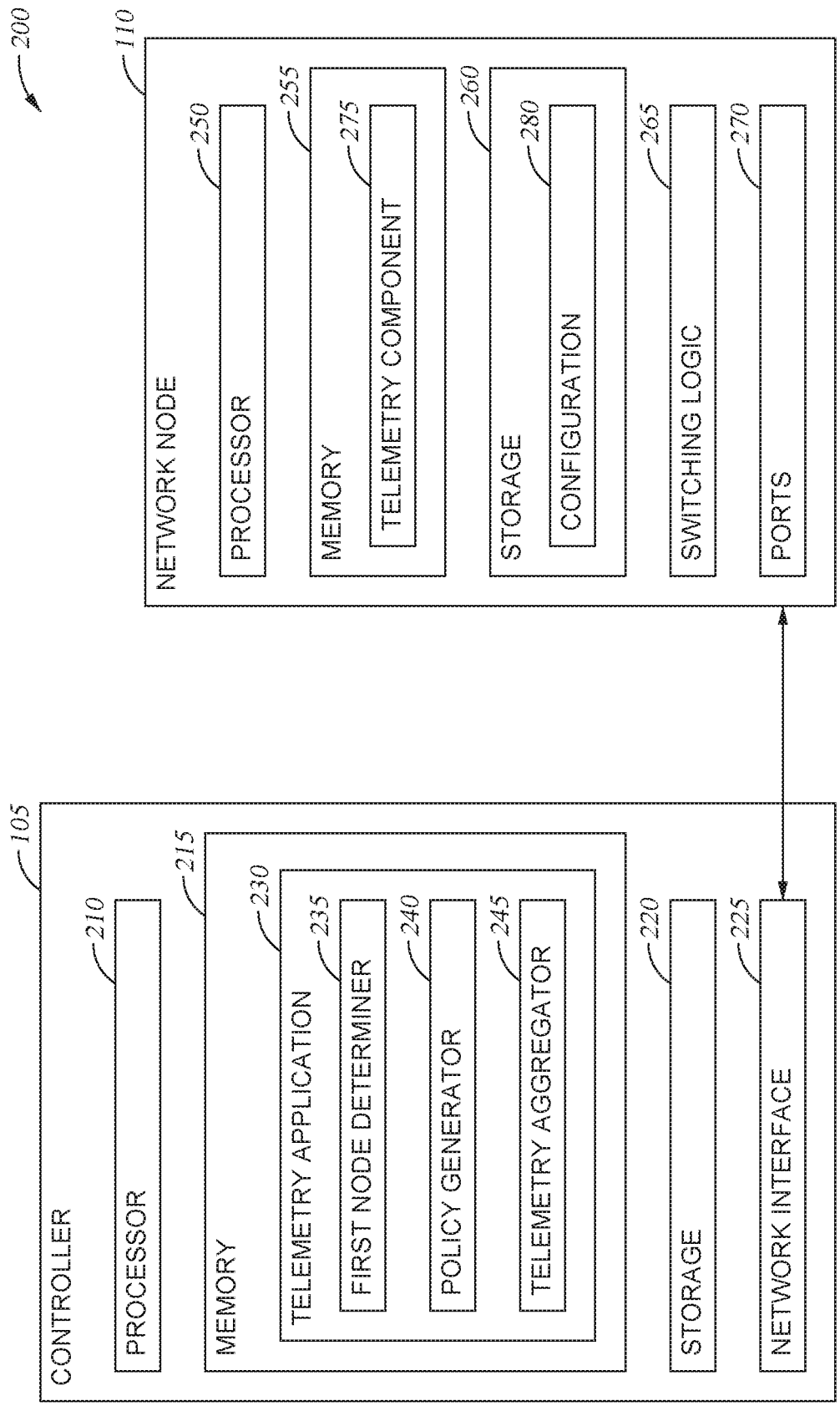
FIG. 2 is a block diagram illustrating a controller and a network node configured to provide packet telemetry, according to one embodiment disclosed herein.

FIG. 2 is a block diagram illustrating a Controller 105 and a Network Node 110 configured to provide packet telemetry, according to one embodiment disclosed herein. As illustrated, the Controller 105 includes a Processor 210, a Memory 215, Storage 220, and a Network Interface 225. In the illustrated embodiment, Processor 210 retrieves and executes programming instructions stored in Memory 215 as well as stores and retrieves application data residing in Storage 220. Processor 210 is representative of a single CPU, multiple CPUs, a single CPU having multiple processing cores, and the like. Memory 215 is generally included to be representative of a random access memory. Storage 220 may be a disk drive or flash-based storage device, and may include fixed and/or removable storage devices, such as fixed disk drives, removable memory cards, or optical storage, network attached storage (NAS), or storage area-network (SAN). Through the Network Interface 225, the Controller 105 may be communicatively coupled with other devices, such as Network Nodes 110, databases, other controllers, user terminals, and the like.

In the illustrated embodiment, the Memory 215 of the Controller 105 includes a Telemetry Application 230. In an embodiment, the Telemetry Application 230 receives an indication of a flow to be analyzed or monitored, and pushes one or more policies to retrieve telemetry for the flow. In the illustrated embodiment, the Telemetry Application 230 includes a First Node Determiner 235, a Policy Generator 240, and a Telemetry Aggregator 245. In one embodiment, the First Node Determiner 235 receives flow information (e.g., a source IP, destination IP, port(s), protocol(s), and the like). The First Node Determiner 235 further determines the expected FHN for the flow, based on the flow information and the topology of the network. As discussed above, in some embodiments, the First Node Determiner 235 may determine that two or more nodes are potential FHN. In the illustrated embodiment, the Policy Generator 240 generates a PTD policy and transmits it to the identified FHN. In one embodiment, the PTD policy includes an indication as to which events to monitor, which data to collect, and the like. In some embodiments, the PTD policy further specifies the location where the telemetry should be sent (e.g., an IP address, protocol, and destination port). In embodiments, the Controller 105 can specify itself as the target to receive the telemetry, or may identify one or more other centralized devices or nodes as the target.

Further, in the illustrated embodiment, the Telemetry Aggregator 245 receives PTD frames from each node that the packet passes through, and aggregates them to determine the overall network path taken by each packet in the flow. In some embodiments, the Telemetry Aggregator 245 further generates an overall path for the flow, based on the individual paths taken by each packet in the flow. For example, in embodiments, the path for a particular packet may differ from other packets in the same flow, based on load balancing efforts, configurations or policies of each node, resource availability at each node, and the like. In one embodiment, the Telemetry Application 230 presents the path information to one or more administrators. In some embodiments, the Telemetry Application 230 can further identify problems in the flow, based on the telemetry. In one embodiment, the Telemetry Application 230 indicates the problems to the administrator, and/or implements a solution, as discussed in more detail below.

In some embodiments, once a problem is identified, the Controller 105 can invoke an action to isolate the identified problematic node, link, forwarding engine, or application-specific integrated circuit (ASIC) so that a redundant node or path can be used to continue forwarding the traffic in the flow. In some embodiments, the Controller 105 can also push one or more policies to the problematic node, in an effort to correct the problem. This ensures maximum availability of the network. Advantageously, in addition to or instead of notifying an administrator, the Controller 105 can operate to isolate the problematic node(s) rapidly in order to restore traffic in a matter of seconds or minutes, rather than in hours or days, as is often required in traditional systems.

In the illustrated embodiment, the Network Node 110 includes a Processor 250, a Memory 255, Storage 260, Switching Logic 265, and one or more Ports 270. In the illustrated embodiment, Processor 250 retrieves and executes programming instructions stored in Memory 255 as well as stores and retrieves application data residing in Storage 260. Processor 250 is representative of a single CPU, multiple CPUs, a single CPU having multiple processing cores, and the like. Memory 255 is generally included to be representative of a random access memory. Storage 260 may be a disk drive or flash-based storage device, and may include fixed and/or removable storage devices, such as fixed disk drives, removable memory cards, or optical storage, network attached storage (NAS), or storage area-network (SAN). Through the Ports 270, the Network Node 305 may be communicatively coupled with other devices, such as other network nodes, databases, controllers, workloads and hosts, and the like.

In the illustrated embodiment, the Switching Logic 265 handles routing of packets through the Network Node 110. In embodiments, the Switching Logic 265 is logic encoded in a non-transitory medium (e.g., encoded in software stored in memory or storage, or encoded via one or more hardware components). In one embodiment, the Switching Logic 265 is implemented through software (e.g., as an application stored in Memory 255). In other embodiments, the Switching Logic 265 is implemented using one or more integrated circuits, such as ASICs. In some embodiments, the Switching Logic 265 is a mixture of hardware and software. In the illustrated embodiment, when packets are received via one or more Ports 270, they are processed according to the Switching Logic 265.

In one embodiment, the Switching Logic 265 includes multiple forwarding engines. In some embodiments, the Network Node 110 uses separate forwarding engines for ingress and egress from the node. In one embodiment, the forwarding engines are selected based in part on the port the packet was received on, the current load or latency of each engine, and the like. Further, in some embodiments, the Switching Logic 265 includes connections between the various forwarding engines and/or ports, in order to facilitate routing of the packets.

In the illustrated embodiment, the Memory 255 of the Network Node 110 includes a Telemetry Component 275. In an embodiment, the Telemetry Component 275 gathers telemetry about the Network Node 110, as specified by the PTD policy or header. For example, in one embodiment, upon receiving a packet belonging to a flow that has been designated by the Controller 105 for monitoring, the Telemetry Component 275 gathers the indicated telemetry and information about the flow. Similarly, in an embodiment, upon receiving a packet carrying a PTD header, the Telemetry Component 275 collects the indicated telemetry. In one embodiment, the Telemetry Component 275 gathers telemetry information such as timestamps, queue occupancy, and the like. In some embodiments, the Telemetry Component 275 gathers information about causation if a packet is dropped or encounters congestion, as discussed in more detail below. Additionally, in some embodiments, this information is gathered by the Switching Logic 265 during routing of the packet, and is packaged and transmitted by the Telemetry Component 275.

In some embodiments, in addition to gathering such telemetry, the Telemetry Component 275 also identifies a reason for any packet drops. In some embodiments, the reasoning is collected instead by the Switching Logic 265, and is packaged and forwarded by the Telemetry Component 275. That is, in one embodiment, when the packet is dropped by the Switching Logic 265, the reason for the drop is provided to the Telemetry Component 275. The Telemetry Component 275 then generates a PTD frame to transmit the data to the Controller 105, as discussed in more detail below.

In embodiments, a given packet can be dropped for a variety of reasons. One such reason is that the route was not present or is misprogrammed in the hardware. Other reasons include the packet being dropped on ingress or egress from the Network Node 110 due to color blocking logic (CBL) (e.g., a block caused by a spanning tree). Similarly, in embodiments, the packet may be dropped due to lack of buffer(s) or buffer space in the Network Node 110. Further, in embodiments, a packet can be dropped due to the packet sitting in a virtual output queue (VOQ) for too long (for example, because transmit credit(s) are not available). Additionally, the packet can be dropped because one or more security access control list(s) (ACLs) deny the traffic. Moreover, in embodiments, the packet may be lost because it was successfully transmitted from the Network Node 110 to the next node, but was never received by the next node (e.g., because the packet encountered a cyclic redundancy check (CRC) error on the link between the nodes). Of course, in embodiments, the reasons discussed herein are not intended to be limiting, and any reason for packet drop can be captured by the Telemetry Component 275.

In the illustrated embodiment, the Storage 260 of the Network Node 110 includes a Configuration 280. In an embodiment, the Controller 105 defines the Configuration 280 of the Network Node 110. In one embodiment, the Controller 105 uses policies to modify the Configuration 280. For example, in an embodiment, the policies can affect routing, resource usage, load balancing, security, and the like. In the illustrated embodiment, the Controller 105 pushes PTD policies to the Network Node 110, indicating one or more flows to be monitored. For example, in one embodiment, the Controller 105 pushes a PTD policy upon determining that the Network Node 110 is expected to be the FHN of a flow that is to be monitored. In an embodiment, the PTD policy instructs the Network Node 110 to insert a PTD header into each packet of the indicated flow. Further, the Network Node 110 retrieves the indicated telemetry data, and transmits it to the Controller 105 for each such packet.

FIG. 3 illustrates a PTD Header 305 and a PTD Frame 325, according to one embodiment disclosed herein. In the illustrated embodiment, the PTD Header 305 is includes Controller Information 310 and notification Flags 315. As illustrated, the header further includes the Packet Flow Information 320. In some embodiments, the Packet Flow Information 320 refers to the flow headers already included with the packet, and the PTD Header 305 includes the Controller Information 310 and Flags 315. For example, in an embodiment, the Packet Flow Information 320 includes the source and destination IP addresses of the packet, the L4 port, the protocol, and the like. Although not illustrated, in embodiments, the packet can include other fields or headers (including a payload). In an embodiment, the FHN in the flow inserts the PTD Header 305 (e.g., the Controller Information 310 and Flags 315) upon determining that the packet belongs to a flow that has been flagged for monitoring.

In embodiments, the Controller Information 310 refers to the Controller 105 to which the PTD should be sent. For example, in one embodiment, the Controller Information 310 includes the IP address of the controller, the protocol to use (e.g., TCP or UDP), the destination port of the controller that PTD frames should be sent to, and the like. In the illustrated embodiment, the Flags 315 include a series of flags indicating when PTD frames should be sent to the Controller 105. For example, in one embodiment, each Network Node 110 can transmit telemetry data upon the occurrence of one or more events. In one embodiment, the flags include a "notify on drop" flag which instructs the node to send a PTD frame to the controller if the packet is dropped. In embodiments, the Flags 315 can also include a "notify on forward" flag instructing the node to notify the controller when the packet is forwarded from the node, as well as a "notify on congestion" flag, which instructs the node to notify the controller if the packet encounters congestion in the node. In some embodiments, the PTD Header 305 also includes an indication as to what specific data or types of telemetry should be gathered (e.g., queue occupancy, resource usage of the node, which reasons for packet drop should be monitored, and the like).

In an embodiment, when a PTD policy is received by a Network Node 110, the Network Node 110 configures itself (e.g., via one or more filters) to insert a PTD Header 305 into each packet belonging to the indicated flow. In embodiments, the contents of the PTD Header 305 are generated by the node based on the contents of the PTD policy. For example, in one embodiment, the Network Node 110 fills the Controller Information 310 to indicate the Controller 105 that transmitted the PTD policy. In some embodiments, the Controller 105 that transmitted the policy can indicate a different controller or device to receive the telemetry data. Further, in embodiments, when a Network Node 110 receives a packet including a PTD Header 305, the Network Node 110 collects telemetry data and transmits it to the Controller 105 indicated in the Controller Information 310, upon the occurrence of one or more of the events specified by the Flags 315.

In the illustrated embodiment, the PTD Frame 325 is prepared by the Telemetry Component 275 of the Network Node 110, and is transmitted to the indicated Controller 105 upon the happening of each specified event in the Flags 315. In the illustrated embodiment, the PTD Frame 325 includes a Node ID 330, an ASIC ID 335, Packet Flow Information 340, a Reason Code 345, and Additional Information 350. In one embodiment, the Node ID 330 includes a unique identifier of the Network Node 110 that is transmitting the telemetry. In an embodiment, the Network Node 110 can be a switch, a router, and the like. Further, in the illustrated embodiment, the ASIC ID 335 is a unique identifier of the particular ASIC or forwarding engine on the Network Node 110 that is associated with the telemetry data. For example, if the packet was successfully forwarded, the ASIC ID 335 indicates the ASIC(s) that participated in the forwarding. Similarly, if the packet encountered congestion and/or was dropped, the ASIC ID 335 indicates the ASIC(s) where the congestion and/or drop occurred.

Further, in an embodiment, the Packet Flow Information 340 identifies the flow that the PTD Frame 325 relates to, and includes information such as the source and destination IP addresses, L4 port, protocol, and the like. In the illustrated embodiment, if the packet was dropped, the Reason Code 345 includes an indication as to the reason the packet was dropped. For example, in embodiments, the reason code can indicate that the route was not present, an ingress or egress CBL drop, that the port is not a member of the VLAN of the packet, a lack of ingress buffers, a lack of transmit credits, a security ACL drop on ingress or egress, and the like. Additionally, in the illustrated embodiment, the Additional Information 350 includes any additional information that is related to the forwarding action and/or reason code. For example, in embodiments, the Additional Information 350 can include traditional telemetry (such as queue occupancy, the timestamp, and the like).

Figure 4B:
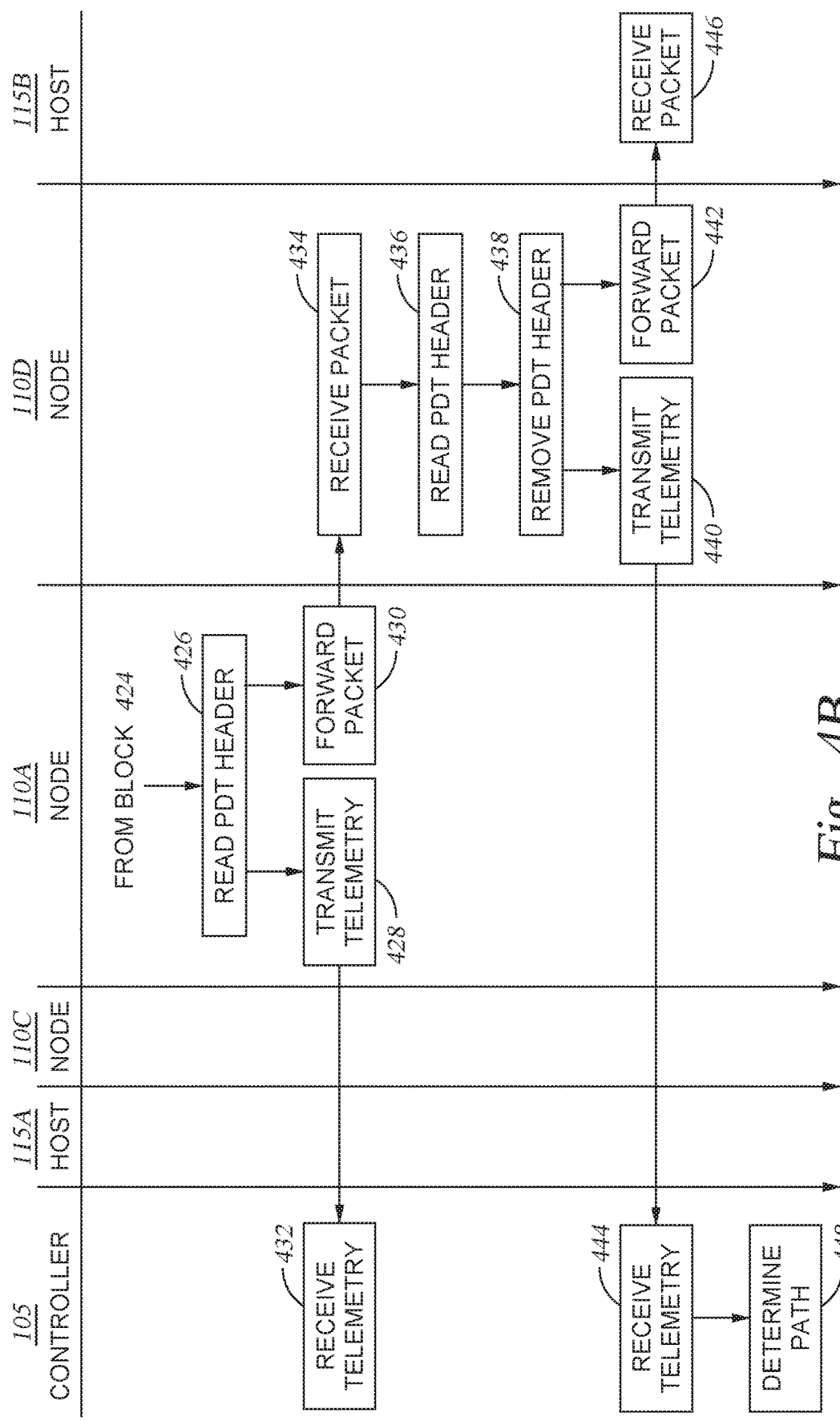

FIGS. 4A and 4B illustrate a workflow 400 for monitoring packet telemetry, according to one embodiment disclosed herein. In the illustrated embodiment the workflow 400 is implemented by the devices and entities illustrated in FIG. 1. As illustrated, the actions or operations performed by each respective entity (e.g., the Controller 105, Hosts 115, and Nodes 110) are included within a respective column for the entity. For example, as illustrated, the operations performed by the Controller 105 are included in the left-most column. Moving towards the right, the operations completed by the Host 115A, Node 110C, Node 110A, Node 110D, and Host 110B are illustrated sequentially. In the illustrated embodiment, the workflow 400 is utilized to monitor a flow of packets from Host 115A to Host 115B.

The workflow 400 begins at block 404, where the Controller 105 Receives flow information. In the illustrated embodiment, the flow information indicates that the Controller 105 should request telemetry for the flow from Host 115A to Host 115B. In some embodiments, the flow can be indicated by a user. For example, in one embodiment, a user, customer, or administrator can record a complaint or issue regarding the flow (e.g., indicating that packets are not being received, delays are occurring, and the like). In some embodiments, the Controller 105 itself can identify the flow as a candidate for monitoring. For example, in one embodiment, the Controller 105 periodically initiates monitoring one or more individual flows to ensure they are operating as expected. In some embodiments, the Controller 105 can determine a potential problem, and initiate monitoring of the relevant flow(s).

The workflow 400 then continues to block 406, where the Controller 105 determines the FHN for the selected flow. In some embodiments, as discussed above, the Controller 105 knows the network topology. Based on the indicated source and destination addresses for the flow, therefore, the Controller 105 can identify the node that is expected to act as the FHN for the flow. In the illustrated embodiment, the FHN for the flow from Host 115A to Host 115B is the Node 110C, as discussed above. The workflow 400 then continues to block 408, where the Controller 105 pushes a PTD policy to the identified FHN (e.g., to the Node 110C). In an embodiment, PTD policy further includes the flow information, and the remote analyzer information (indicating the controller or collector to which the telemetry should be transmitted).

At block 410, the Node 110C receives the PTD policy, and implements it. As discussed above, in one embodiment, the Node 110C implements the policy by adjusting its configuration (e.g., by instantiating one or more filters) to insert a PTD header into each packet associated with the indicated flow. In some embodiments, the PTD policy remains in place on the Node 110C until the Controller 105 instructs the Node 110C to remove it. In one embodiment, the PTD policy lasts for a predefined period of time or until a predefined time (which may be specified in the PTD policy), at which point the policy is automatically terminated. In some embodiments, the PTD policy instructs the Node 110C to attach a PTD header to every packet in the identified flow. In some embodiments, the PTD policy instructs the Node 110C to insert the PTD header to only a subset of the packets. For example, in one embodiment, the PTD header is inserted into every Nth packet, where the PTD policy specifies N. Similarly, in one embodiment, the PTD policy instructs the Node 110C to insert a PTD header every M seconds. Additionally, in some embodiments, the PTD policy instructs the Node 110C to insert PTD headers randomly (or quasi-randomly) into packets in the flow (e.g., to insert a PTD header into 25% of packets belonging to the flow, to be selected randomly or quasi-randomly).

Subsequently, at block 412, the Host 115A transmits a packet to Host 115B via the Node 110C. Notably, in embodiments, the flow of packets from Host 115A to Host 1156 may have been initiated prior to the policy being created or implemented by the Node 110C. That is, although the illustrated workflow 400 includes only a single packet, in embodiments, any number of packets may have already been transmitted. Similarly, any number of packets can follow the packet transmitted in block 412. Further, any amount of time can elapse between block 410 and block 412.

The workflow 400 then continues to block 414, where the packet is received at the Node 110C, acting as the FHN. At block 416, based on the PTD policy (e.g., based on determining that the packet belongs to the indicated flow), the Node 110C adds a PTD header to the packet. As discussed above, in embodiments, the PTD header includes an indication as to the specified recipient for the telemetry data (e.g., the Controller 105 or some other device or entity), as well as one or more flags indicating which events and/or data to monitor.

The workflow 400 then continues to blocks 418 and 420, which are illustrated in parallel to aid understanding. In block 418, the Node 110C transmits the telemetry in the form of a PTD frame to the Controller 105. Additionally, in block 420, the Node 110C forwards the packet to the Node 110A, which is next in the network path. Although illustrated as occurring in parallel, in embodiments, the operations can occur sequentially. In one embodiment, the Node 110C first forwards the packet, and subsequently generates and transmits the PTD frame to the Controller 105. In this way, the Node 110C can determine whether the forwarding was successful, and collect telemetry regarding egress from the Node 110C. At block 422, the Controller 105 receives the PTD frame from the Node 110C.

At block 424, the Node 110A receives the packet. The workflow 400 then continues to block 426, in FIG. 4B. At block 426, the Node 110A determines that the packet has a PTD header, and reads/analyzes the PTD header to identify the node to which the telemetry data should be transmitted, as well as what data is to be collected. The workflow 400 proceeds to blocks 428 and 438, where the Node 110A transmits the telemetry to the Controller 105 (e.g., in the form of a PTD frame), and routes/forwards the packet to the next Node 110D. As discussed above, although illustrated as concurrent operations, in some embodiments, the blocks 428 and 430 are performed sequentially. Further, at block 432, the Controller 105 receives the telemetry data from the Node 110A.

At block 434, the Node 110D receives the packet from the Node 110C. The workflow 400 continues to block 436, where the Node 110D identifies the PTD header carried by the packet, and reads/analyzes it to identify the node or controller to which the telemetry data should be transmitted, as well as what data is to be collected. The workflow 400 proceeds to block 438, where, upon determining that it is the LHN for the flow (e.g., the last network node prior to the destination), the Node 110D removes the PTD header from the packet. At blocks 440 and 442, the Node 110D transmits the telemetry to the Controller 105 (e.g., in the form of a PTD frame), and routes/forwards the packet to the Host 115B. As discussed above, although illustrated as concurrent operations, in some embodiments, the blocks 440 and 442 are performed sequentially. At block 444, the Controller 105 receives the telemetry data from the Node 110D. At block 446, the Host 115B receives the packet.

The workflow 400 then proceeds to block 448, where the Controller 105 determines the network path for the packet. In one embodiment, the Controller 105 generates the network path based on determining that predefined criteria have been satisfied. For example, in one embodiment, one such criterion is determining that the packet was successfully forwarded through the network to the Host 115B. In an embodiment, the Controller 105 can determine that the packet was received based on receiving an indication of successful forwarding from the LHN, Node 110D. In some embodiments, the Controller 105 also determines the network path based on receiving an indication of failure from one of the Nodes 110. For example, if one of the received PTD frames indicates that the packet was dropped, the Controller 105 determines the network path up to the node that dropped the packet.

In some embodiments, if the packet was dropped, the Controller 105 can further takes steps to isolate the problematic node from the flow, in order to ensure the traffic can proceed normally through redundant paths. In one embodiment, the Controller 105 only takes such steps if a predefined number of the packets passing through the problematic node are dropped. For example, in one embodiment, the Controller 105 may notify a user or administrator of the drops, but refrain from taking action until a minimum number of drops have occurred. In some embodiments, the Controller 105 refrains from taking action unless a predefined percentage of the packets are dropped by the node. Further, in some embodiments, the Controller 105 can determine action is warranted upon determining that a particular node or ASIC is suffering congestion, and/or is likely to begin dropping packets.

In one embodiment, upon determining that action is warranted, the Controller 105 transmits one or more policies to one or more nodes in the network to isolate the problematic node and route traffic for the flow through one or more other paths. For example, suppose the packet was dropped by Node 110A. In an embodiment, the Controller 105 pushes a policy to the Node 110C, indicating that packets belonging to the identified flow are to be forwarded through the Node 110B, rather than the Node 110A, until further notice. In this way, the Controller 105 can dynamically reroute traffic to ensure optimal network performance. Notably, in an embodiment, the Controller 105 only reroutes traffic for the identified flow, and does not route all traffic to avoid the node. In some embodiments, the Controller 105 can alternatively push one or more policies to the Node 110A or Node 110C that cause a different ASIC or forwarding engine to be used by the Node 110A, in order to avoid the problem.

In some embodiments, the Controller 105 implements these changes automatically. In other embodiments, the Controller 105 suggests changes to an administrator, and awaits approval or confirmation. In some embodiments, the Controller 105 provides an indication as to the network path(s) being taken by packets in the flow, as well as an indication as to any nodes or ASICs that are dropping packets or suffering congestion. Further, in some embodiments, the Controller 105 does not reconfigure the Nodes 110 to use the problematic node to forward packets for the flow until the administrator has confirmed or indicated that the problem has been solved. In some embodiments, the Controller 105 periodically configures the nodes to send one or more test packets (e.g., to allow one or more packets from the flow) to be forwarded through the problematic node, in order to determine if the problem has been fixed. If so, the Controller 105 can configure the network to operate as it did before the problem was discovered.

Figure 5:
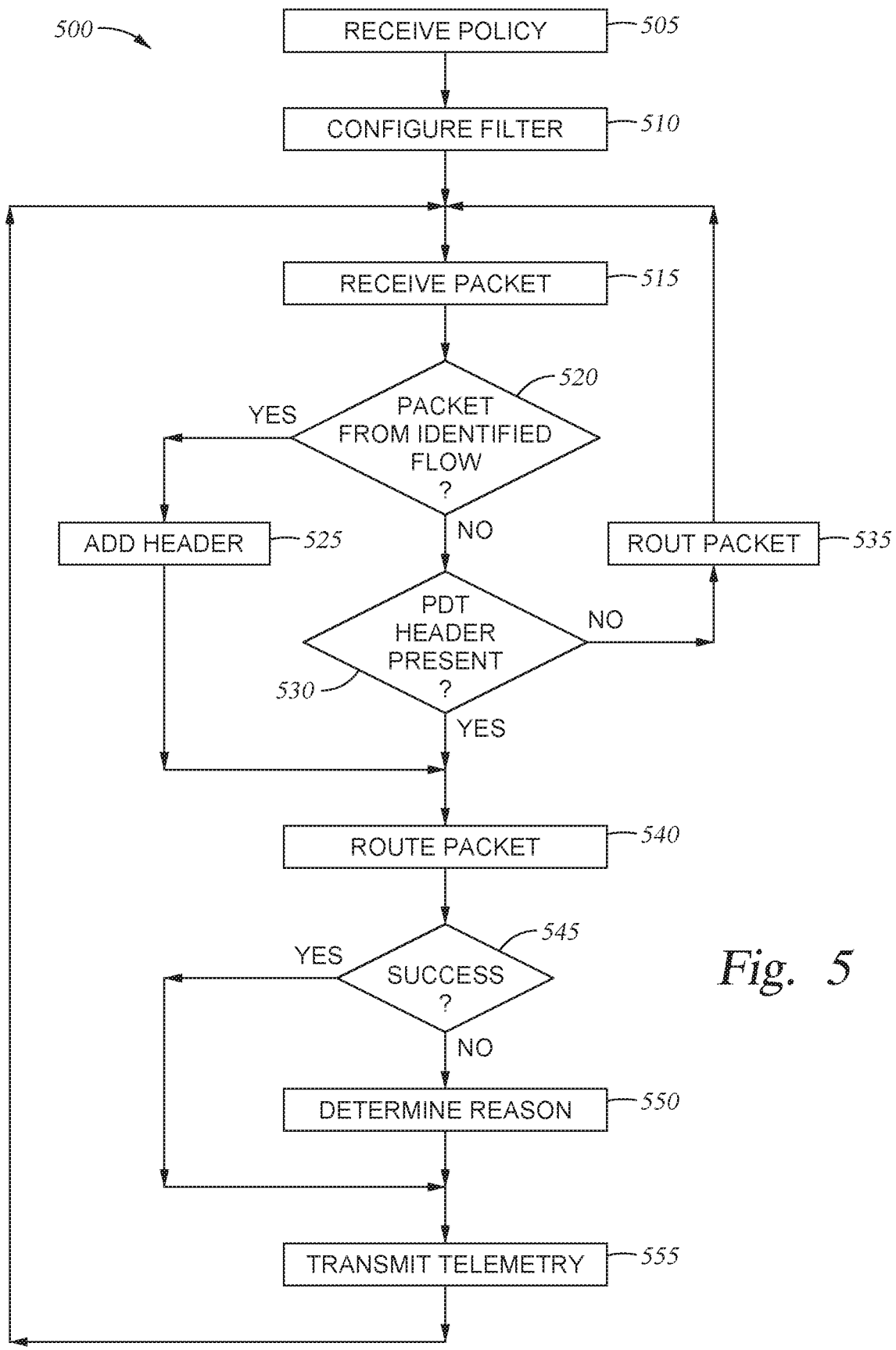
FIG. 5 is a flow diagram illustrating a method of providing packet telemetry data via node policies, according to one embodiment disclosed herein.

FIG. 5 is a flow diagram illustrating a method 500 of providing packet telemetry data via node policies, according to one embodiment disclosed herein. The method 500 begins at block 505, where a Network Node 110 receives a policy from a Controller 105. The method 500 then proceeds to block 510, where the Network Node 110 configures one or more filters to implement the policy. In embodiments, a given Network Node 110 can implement any number of policies at a given time, and may be monitoring multiple flows. At block 515, the Network Node 110 receives a packet. The method 500 then proceeds to block 520, where the Network Node 110 determines whether the packet belongs to an identified flow that has been specified in a PTD policy received by the Network Node 110. If so, the method 500 proceeds to block 525, where the Network Node 110 adds a PTD header to the packet. The method 500 then continues to block 540.

If, at block 520, the Network Node 110 determines that the packet is not from any identified flow, the method 500 continues to block 530, where the Network Node 110 determines whether the packet includes a PTD header. In embodiments, the packet may already contain a PTD header if the Network Node 110 is acting as an intermediate node (e.g., a NHN) or a LHN for the flow. If there is no PTD header present, the method 500 continues to block 535, where the Network Node 110 routes the packet as normally, and refrains from gathering or transmitting any telemetry for the packet. The method 500 then returns to block 515, to receive the next packet. If, however, the Network Node 110 determines that the packet has a PTD header, the method 500 proceeds to block 540.

At block 540, the Network Node 110 routes the packet. During this routing process, the Network Node 110 collects telemetry regarding the forwarding of the packet. The method 500 then continues to block 545, where the Network Node 110 determines whether the packet was routed or forwarded successfully. In some embodiments, block 545 includes determining whether the packet was dropped, encountered congestion, or was forwarded normally. If the packet was routed successfully, the method 500 continues to block 555, where the Network Node 110 forwards telemetry to the Controller 105 indicated in the PTD header (or the PTD policy). In some embodiments, as discussed above, the PTD policy (and/or PTD header) indicates that telemetry is to be transmitted only upon certain events (e.g., upon forwarding, congestion, or dropping of the packet). Thus, in some embodiments, if the packet is routed successfully without dropping or congestion, the node does not transmit any data to the Controller 105.

If, at block 545, the Network Node 110 determines that there was some failure in routing of the packet, the method 500 proceeds to block 550, where the Network Node 110 determines the reason for the failure. In embodiments, the failure can include dropping the packet and/or congestion or delay when routing the packet. As discussed above, in some embodiments, the Network Node 110 determines the reason for the drop or congestion (e.g., ACL security, lack of buffer space, etc.) in order to provide a fuller understanding to the Controller 105. The method 500 then proceeds to block 555, where the Network Node 110 transmits this telemetry to the Controller 105. Finally, the method 500 returns to block 515, to receive additional packets.

Figure 6:
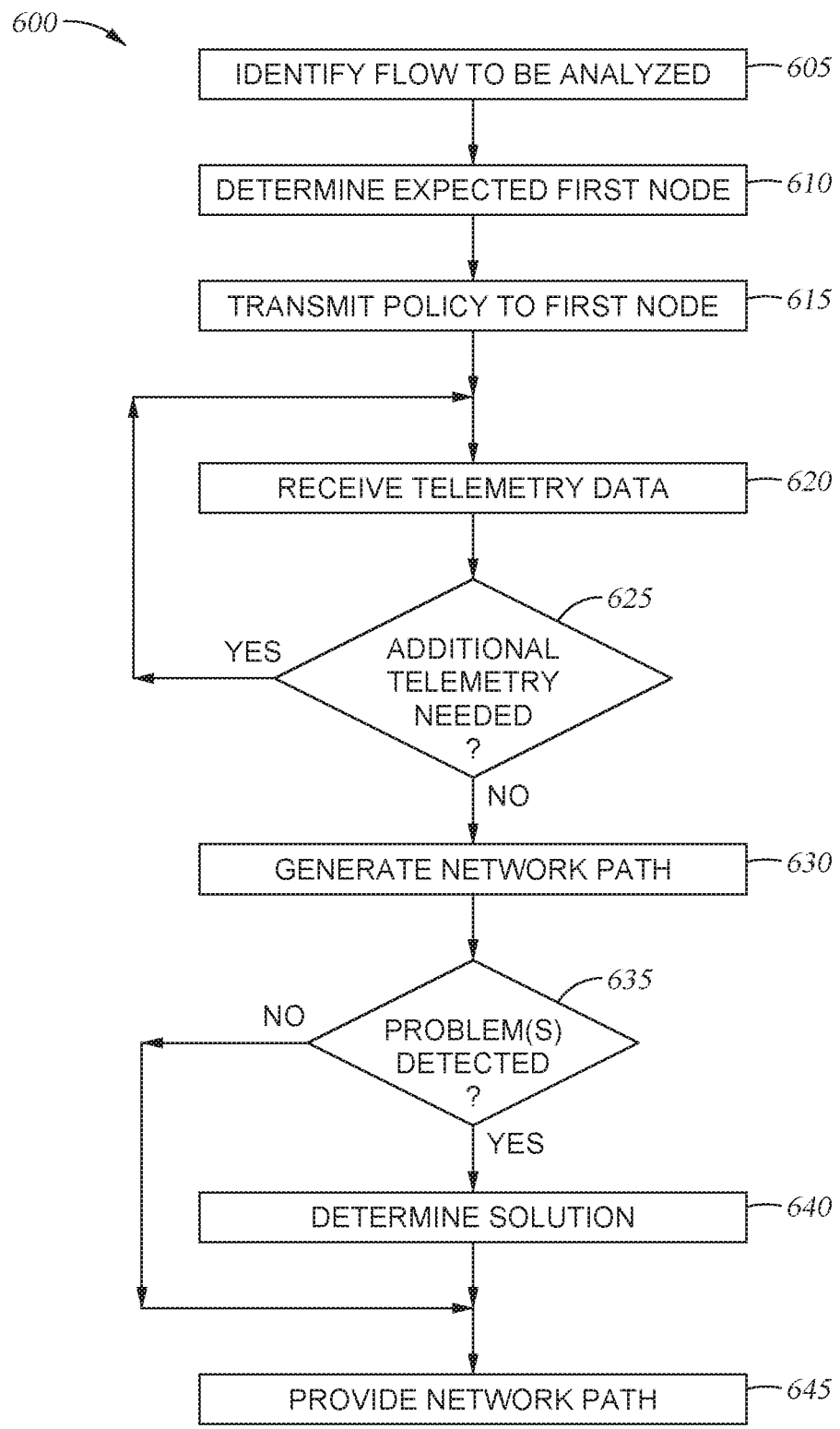
FIG. 6 is a flow diagram illustrating a method of monitoring packet telemetry, according to one embodiment disclosed herein.

FIG. 6 is a flow diagram illustrating a method 600 of monitoring packet telemetry, according to one embodiment disclosed herein. The method 600 begins at block 605, where a Controller 105 identifies a flow to be analyzed. As discussed above, in some embodiments, the flow is identified by a user, customer, or administrator as potentially problematic. In some embodiments, the Controller 105 identifies potentially problematic flows, as discussed above. The method 600 then proceeds to block 610, where the Controller 105 determines the expected FHN for the identified flow. At block 615, the Controller 105 generates a PTD policy to the identified FHN, instructing the FHN to begin inserting PTD headers to packets in the flow, as discussed above.

Subsequently, at block 620, the Controller 105 receives telemetry data for a first packet in the flow (e.g., one or more PTD frames) from one or more network nodes (e.g., the FHN, a NHN, and/or the LHN). In some embodiments, PTD frames relating to each individual packet are correlated with other frames for the same packet, to determine the overall path and telemetry for the packet. Further, in some embodiments, the individual paths (including telemetry data such as congestion and being dropped) for each individual packet can be aggregated to determine an overall path for the flow, as discussed above.

The method 600 then continues to block 625, where the Controller 105 determines whether additional telemetry is needed to complete the packet's path. For example, in one embodiment, the Controller 105 can determine whether an indication of success has been received from the LHN. If so, the packet path is complete. Similarly, in one embodiment, the Controller 105 determines whether the PTD frame indicates that the packet has been dropped. If so, the Controller 105 determines that no additional data frames are expected, and the packet path is finished. If the Controller 105 determines that the packet's path is not complete, the method 600 returns to block 620 to receive additional telemetry.

If the Controller 105 determines that all available telemetry for the packet has been received, the method 600 continues to block 630. At block 630, the Controller 105 determines the network path for the packet. In some embodiments, the network path includes a sequence of network nodes through which the packet was routed. Additionally, in some embodiments, the telemetry includes information about each node (e.g., congestion, queue occupancy, and the like). As discussed above, in some embodiments, the Controller 105 repeats this process for multiple packets from the flow. That is, in some embodiments, the Controller 105 receives telemetry data and determines network paths for one or more other packets in the flow. Further, in some embodiments, the Controller 105 also aggregates the individual paths to determine an overall packet path for the flow.

The method 600 then proceeds to block 635, where the Controller 105 determines whether any problems are detected based on the packet path(s) for the flow. For example, in one embodiment, problems can exist if one or more nodes are dropping packets. In some embodiments, the Controller 105 determines whether a predefined number or percentage of packets are being dropped by a single node or group of nodes. Further, in some embodiments, the Controller 105 determines if one or more nodes are experiencing congestion (or are experiencing increased congestion as compared to a normal amount). In one embodiment, if a predefined number or percentage of the packets are experiencing congestion, or the congestion exceeds a predefined threshold, the Controller 105 determines that the congestion is a potential problem (e.g., because it may indicate a likelihood of packet drop).

If no problems are detected, the method 600 proceeds to block 645, where the Controller 105 provides the determined network path(s). For example, in one embodiment, the Controller 105 provides the path(s) to an administrator, operator, or user for analysis. If, however, the Controller 105 determines at block 635 that at least one problem is identified, the method 600 optionally proceeds to block 640 where the Controller 105 determines a potential solution for the problem(s). In some embodiments, however, the method 600 continues to block 645, skipping block 640, where the Controller 105 provides the path(s), and optionally provides an indication as to the potential problems.

As discussed above, in some embodiments, the Controller 105 can identify and implement solutions to the problem(s) by adjusting the configuration of the network. For example, in one embodiment, the Controller 105 pushes one or more policies to one or more network nodes to adjust the routing and forwarding process (e.g., to better balance load, to avoid certain nodes or forwarding engines, and the like). In some embodiments, the Controller 105 identifies potential solutions, but does not implement them. Instead, in such an embodiment, the Controller 105 provides the suggested solution to one or more administrators, and awaits validation or confirmation prior to proceeding to implement it.

Figure 7:
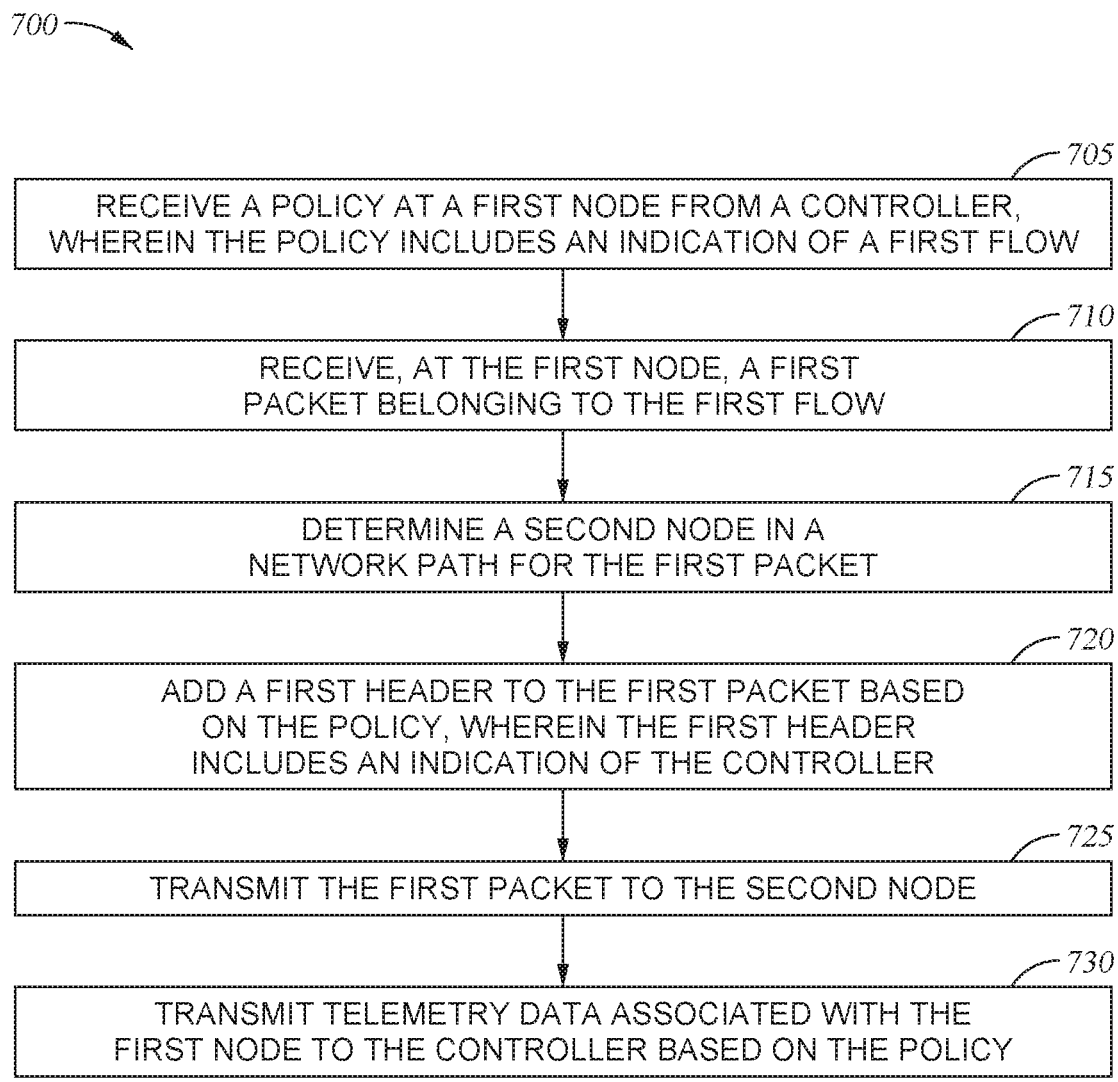
FIG. 7 is a flow diagram illustrating a method of providing packet telemetry data, according to one embodiment disclosed herein.

FIG. 7 is a flow diagram illustrating a method 700 of providing packet telemetry data, according to one embodiment disclosed herein. The method 700 begins at block 705, where a Network Node 110 receives a policy a controller, wherein the policy includes an indication of a first flow. The method 700 then continues to block 710, where the Network Node 110 receives a first packet belonging to the first flow.

Further, at block 715, the Network Node 110 determines a second node in a network path for the first packet. The method 700 then proceeds to block 720, where the Network Node 110 adds a first header to the first packet based on the policy, wherein the first header includes an indication of the controller. At block 725, the Network Node 110 transmits the first packet to the second node. Finally, the method 700 continues to block 730, where the Network Node 110 transmits telemetry data associated with the Network Node 110 to the controller based on the policy.

Embodiments of the present disclosure enable a policy to follow a packet throughout a network, while the policy is only pushed to a first node in the network. Network telemetry is used herein for illustration (e.g., each downstream node is instructed to collect and transmit telemetry data to a central controller, based on a PTD policy from the first node). However, these examples are not intended to be limiting on the present disclosure. Embodiments of the present disclosure can be applied to other techniques as well, to allow a policy to modify how a packet is handled at each node in the network, while the policy is pushed to a single node. For example, in some embodiments, a policy affecting the routing of a flow can be pushed to a FHN, and the FHN can attach a header instructing all downstream nodes to modify the routing behavior for the packets in the flow. In embodiments, the differing behavior can include different routing, forwarding it to different locations, copying the packets, and the like.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Telemetry Application 230, or Telemetry Component 275) or related data available in the cloud. For example, the Telemetry Application 230 could execute on a computing system in the cloud and monitor flow data from one or more flows. In such a case, the Telemetry Application 230 could generate and transmit PTD policies to network nodes, and store packet telemetry and flow data at a storage location in the cloud. Doing so allows a user to access this information from any computing system attached to a network connected to the cloud (e.g., the Internet).

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   receiving a policy at a first node from a controller, wherein the policy includes an indication of a first flow;
   receiving, at the first node, a first packet belonging to the first flow;
   determining a second node in a network path for the first packet;
   adding a first header to the first packet based on the policy, wherein the first header includes an indication of the controller;
   transmitting the first packet to the second node;
   transmitting telemetry data associated with the first node to the controller based on the policy;
   receiving a second packet, wherein the second packet includes a second header, wherein the second header includes an indication of the controller;
   determining a third node in a network path for the second packet;
   transmitting the second packet to the third node; and
   transmitting telemetry data associated with the first node to the controller, based on the second header.

2. The method of claim 1, the method further comprising, prior to transmitting the second packet to the third node, removing the second header from the second packet.

3. The method of claim 1, wherein the first header indicates that the first node is to record telemetry data when one or more predefined events occur.

4. The method of claim 3, wherein the one or more predefined events includes at least one of: (i) dropping the first packet, (ii) forwarding the first packet, or (iii) encountering congestion when processing the first packet.

5. The method of claim 1, the method further comprising:
   receiving a third packet, wherein the third packet includes a third header, wherein the third header includes an indication of the controller;
   dropping the third packet; and
   transmitting telemetry data associated with the first node to the controller based on the third header, wherein the telemetry data indicates that the third packet was dropped.

6. The method of claim 5, wherein the telemetry data further indicates a reason that the third packet was dropped.

7. A computer product comprising logic encoded in a non-transitory medium, the logic executable by operation of one or more computer processors to perform an operation comprising:
   receiving a policy at a first node from a controller, wherein the policy includes an indication of a first flow;
   receiving, at the first node, a first packet belonging to the first flow;
   determining a second node in a network path for the first packet;
   adding a first header to the first packet based on the policy, wherein the first header includes an indication of the controller;
   transmitting the first packet to the second node;
   transmitting telemetry data associated with the first node to the controller based on the policy;
   receiving a second packet belonging to a second flow, wherein the second packet includes a second header including an indication of the controller;
   determining a third node in a network path for the second packet;
   transmitting the second packet to the third node; and
   transmitting telemetry data associated with the first node to the controller, based on the second header.

8. The computer product of claim 7, the operation further comprising, prior to transmitting the second packet to the third node, removing the second header from the second packet.

9. The computer product of claim 7, wherein the first header indicates that the first node is to record telemetry data when one or more predefined events occur.

10. The computer product of claim 9, wherein the one or more predefined events includes at least one of: (i) dropping the first packet, (ii) forwarding the first packet, or (iii) encountering congestion when processing the first packet.

11. The computer product of claim 7, the operation further comprising:
 receiving a third packet, wherein the third packet includes a third header, wherein the third header includes an indication of the controller;
 dropping the third packet; and
 transmitting telemetry data associated with the first node to the controller based on the third header, wherein the telemetry data indicates that the third packet was dropped.

12. The computer product of claim 11, wherein the telemetry data further indicates a reason that the third packet was dropped.

13. A device comprising logic encoded in a non-transitory medium, the logic executable by operation of one or more computer processors to perform an operation comprising:
 receiving a policy at a first node from a controller, wherein the policy includes an indication of a first flow;
 receiving, at the first node, a first packet belonging to the first flow;
 determining a second node in a network path for the first packet;
 adding a first header to the first packet based on the policy, wherein the first header includes an indication of the controller;
 transmitting the first packet to the second node;
 transmitting telemetry data associated with the first node to the controller based on the policy
 receiving a second packet, wherein the second packet includes a second header, wherein the second header includes an indication of the controller;
 dropping the second packet; and
 transmitting telemetry data associated with the first node to the controller based on the second header, wherein the telemetry data indicates that the second packet was dropped.

14. The device of claim 13, the operation further comprising:
 receiving a third packet, wherein the third packet includes a third header, wherein the third header includes an indication of the controller;
 determining a third node in a network path for the third packet;
 transmitting the third packet to the third node; and
 transmitting telemetry data associated with the first node to the controller, based on the third header.

15. The device of claim 14, the operation further comprising, prior to transmitting the third packet to the third node, removing the third header from the third packet.

16. The device of claim 13, wherein the first header indicates that the first node is to record telemetry data when one or more predefined events occur.

17. The device of claim 16, wherein the one or more predefined events includes at least one of: (i) dropping the first packet, (ii) forwarding the first packet, or (iii) encountering congestion when processing the first packet.

18. The device of claim 13, wherein the telemetry data indicates a reason that the second packet was dropped.

* * * * *

UNITED STATES PATENT AND TRADEMARK OFFICE
CERTIFICATE OF CORRECTION

PATENT NO. : 10,862,807 B2
APPLICATION NO. : 16/136007
DATED : December 8, 2020
INVENTOR(S) : Mouli Vytla et al.

Page 1 of 1

It is certified that error appears in the above-identified patent and that said Letters Patent is hereby corrected as shown below:

In the Specification

In Column 3, Line 62, delete "1108" and insert -- 110B --, therefor.

In Column 3, Line 64, delete "1106." and insert -- 110B. --, therefor.

In Column 3, Line 66, delete "1156" and insert -- 115B --, therefor.

In Column 4, Line 8, delete "1106," and insert -- 110B, --, therefor.

In Column 4, Line 34, delete "1106," and insert -- 110B, --, therefor.

In Column 4, Line 36, delete "1106" and insert -- 110B --, therefor.

In Column 10, Line 41, delete "1156" and insert -- 115B --, therefor.

In Column 11, Line 44, delete "1158." and insert -- 115B. --, therefor.

In Column 12, Line 11, delete "1108," and insert -- 110B, --, therefor.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*